United States Patent
Burton et al.

(10) Patent No.: US 7,642,764 B2
(45) Date of Patent: Jan. 5, 2010

(54) VOLTAGE REGULATOR WITH LOADLINE BASED MOSTLY ON DYNAMIC CURRENT

(75) Inventors: Edward Allyn Burton, Hillsboro, OR (US); Robert J. Greiner, Beaverton, OR (US); Anant S. Deval, Beaverton, OR (US); Douglas Robert Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 11/418,326

(22) Filed: May 3, 2006

(65) Prior Publication Data

US 2008/0122412 A1    May 29, 2008

(51) Int. Cl.
    *G05F 1/62*        (2006.01)
(52) U.S. Cl. ........................ 323/283; 713/300; 323/272
(58) Field of Classification Search ................ 323/272, 323/283; 713/300
    See application file for complete search history.

(56) References Cited

U.S. PATENT DOCUMENTS

| | | | |
|---|---|---|---|
| 6,566,848 B2 * | 5/2003 | Horigan et al. | 323/283 |
| 6,747,855 B2 * | 6/2004 | Kumar et al. | 361/18 |
| 6,801,026 B2 * | 10/2004 | Schrom et al. | 323/272 |
| 2004/0107370 A1 * | 6/2004 | Mosley | 713/300 |
| 2005/0046400 A1 * | 3/2005 | Rotem | 323/234 |
| 2005/0077883 A1 * | 4/2005 | Walters | 323/273 |

OTHER PUBLICATIONS

"Power Delivery for High-Performance Microprocessors", Electronic Package Technology Development, Intel Technology Journal, vol. 9, Issue 04, Nov. 9, 2005—ISSN: 1535-864X, DOI: 10.1535/itj.0904.
"6-Phase Digital Multiphase Controller", Intersil—ISL 6592, Data Sheet, Jan. 3, 2006, FN9163.2 (pp. 1-21).
"Choosing the Right Voltage Regulator", Basics of Design, Microprocessor Power Management, A Supplement to Electronic Design/Sep. 13, 2004, ED Online 8637 (4 pgs.).
Edward Stanford, "New Processors Will Require New Powering Technologies", TDI Power System Solutions, Power Electronics Technology, Feb. 1, 2002 (pp. 1-7).
Wenkang Huang, et al., "A Scalable Multiphase Buck Converter with Average Current Share Bus", International Rectifier, Rhode Island IC Design Center, RI, USA [As presented at APEC 03] (pp. 1-7).
Michael T. Zhang, "Powering Intel Pentium 4 Generation Processors", Platform Technology Operations, Intel Corp., OR, USA, IEEE 2001 (pp. 215-218).

(Continued)

*Primary Examiner*—Adolf Berhane
*Assistant Examiner*—Harry Behm
(74) *Attorney, Agent, or Firm*—Blakely, Sokoloff, Taylor & Zafman LLP

(57) ABSTRACT

A voltage regulator that is to change its DC output voltage as a primary function of a dynamic portion of integrated circuit (IC) supply current, wherein the voltage regulator's voltage dependence on at least one of a) IC supply leakage current, b) IC supply fixed dock current, or c) load current external to the IC, is a secondary and weaker function. Other embodiments are also described and claimed.

23 Claims, 6 Drawing Sheets

OTHER PUBLICATIONS

"Voltage Regulator-Down (VRD) 10.0" Design Guide for Desktop Socket 478, Intel Corp., Feb. 2004, Document No. 252885-003 (pp. 1-50).

U.S. Appl. No. 10/750,585, filed Jul. 7, 2005, Inventor—Edward A. Burton, entitled "Regulating Voltage Applied to An Integrated Circuit and Proxy Frequency" (File No. P18039).

U.S. Appl. No. 11/152,280, filed Jun. 14, 2005, Inventor(s)—Edward Burton, et al., entitled "IC with fully integrated DC-to-DC power converter" (File No. P21504).

U.S. Appl. No. 11/416,535, filed May 3, 2006, Inventor—Edward Burton, entitled "Mechanism for Adaptively Adjusting a Direct Current Loadline in a Multi-Core Processor" (File No. P23975).

* cited by examiner

VOLTAGE REGULATOR WITH LOADLINE BASED MOSTLY ON DYNAMIC CURRENT

Some of the subject matter described in this application is related to U.S. application Ser. No. 11/416,535, filed May 3, 2006 entitled "Mechanism for Adaptively Adjusting a Direct Current Loadline in a Multi-Core Processor" (pending) (P23975).

An embodiment of the invention is related to power delivery for high performance integrated circuits, and more specifically to point of use voltage regulators for microprocessors. Other embodiments are also described.

BACKGROUND

Over the last several decades, significant advancements have been made in personal computer (PC) microprocessor architecture and fabrication techniques, to improve performance and control costs. With each successive generation, an increasing number of functions have been integrated into a processor integrated circuit die. This has been enabled by shrinking the size of the constituent transistor elements. Performance improvements have been obtained by for example increasing the processor dock frequency. As a result, each successive generation of such processors is more powerful and has increasing overall power consumption.

The power consumption of a processor is proportional to a product of its power supply voltage and current. As processors become more advanced, they demand a lower power supply voltage but higher power supply current. For example, in the early days of microprocessors offered by Intel Corp. of Santa Clara, Calif., transistor count per die was in the low 100,000s, processor clocks were running at around 100 MHz, supply voltages were at 5V DC, and supply current was no more than 10 A (depending on the activity level of the processor). With more recent PENTIUM dass processors, transistor count per die is well above 1 million, clocks are in the GHz range, the power supply voltage needs to be dropped to about 1.2V DC or less, while current draw (at high activity levels) easily surpasses 100 A.

The supply voltage needs to be regulated to stay within a certain range, in the presence of operating temperature variations and as the processor transitions between different activity levels. However, the smaller supply voltages have resulted in tighter ranges being required, in the face of large current swings. This has led to many challenges in providing low cost power delivery for advanced processors. Poorly designed power delivery networks can be unstable or have large oscillatory behavior due to too little damping, and such power delivery networks are excluded from further discussion here.

To ensure reliable power delivery for its microprocessor families, Intel has set voltage regulator design guidelines. A voltage regulator (VR) is an electronic circuit that draws current from a power source, to feed the processor and maintain a well-regulated power supply voltage for the processor. The VR maintains a setpoint voltage (e.g., at a so-called "Vcc" node of the processor), using a feedback control loop that repeatedly senses deviations from the setpoint, and corrects for them by increasing or decreasing the amount of current drawn from the source. For greater power conversion efficiency, switching-type regulators are used that draw current from the source using transistor or similar devices that turn on and off at high rates and stay on for relatively short pulses. The setpoint voltage is maintained by suitably controlling the pulse widths.

A VR can be made to respond quickly to deviations from the setpoint voltage (both voltage droops and voltage spikes). However, with present generation processors and VR technology, the supply voltage is not likely to stay within its set tolerance band unless substantial power supply filtering or capacitive decoupling is added. The addition of more filtering helps reduce the voltage and current ripple that is present at the output of every switching regulator. In operation, present generation processors exhibit very fast supply current changes (referred to as deltaI/deltat current surges or steps) that are in the range of 50 A/nsec at the processor, which cause voltage droops on the supply node. Capacitive decoupling refers to the addition of structures (e.g., on-die or in package with the processor) that act as fast energy storage devices, to supply the processor with the needed deltaI, and thereby reduce droop on the power supply node.

An approach for cost effective power delivery is to specify a linear DC loadline or voltage-current relationship for the processor, where the VR is to vary the power supply voltage (Vcc) as a function of processor current (Icc), from zero current to maximum current. The slope of the DC loadline is known as the DC loadline resistance. See plot 102 for Vcc vs. Icc in FIG. 1. This is also referred to as adaptive voltage positioning (AVP). This is in contrast to positioning a nominal voltage midway between Vmin and Vmax, and maintaining a current-independent voltage level, leaving only half of the voltage window for either the transient voltage droop or spike.

AVP keeps Vcc high (e.g., slightly below Vmax) when Icc is low, anticipating a voltage droop when current ramps up, thereby leaving the entire voltage window for the droop. Similarly, AVP keeps the voltage low (e.g., slightly above Vmin) at maximum Icc, anticipating a subsequent voltage spike. FIG. 1 also shows a tolerance band, around a nominal loadline 107 that has a constant slope 109. Ideally, using AVP effectively halves the voltage noise amplitude compared to VRs without AVP. In actual practice, the benefit is generally less than the ideal, but still generally quite significant. The reduction in effective noise amplitude helps reduce the cost of power delivery, by relaxing some of the capacitive decoupling and/or power supply filtering requirements.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
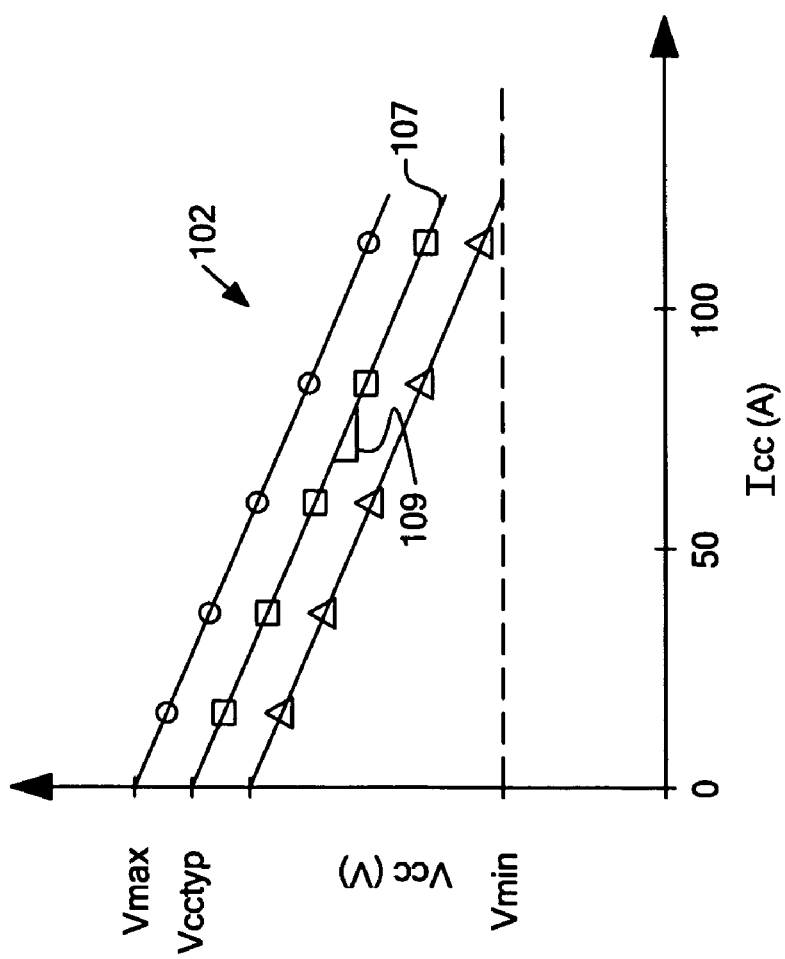
FIG. 1 shows a conventional loadline for a voltage regulator that powers a high performance processor.
Figure 2:
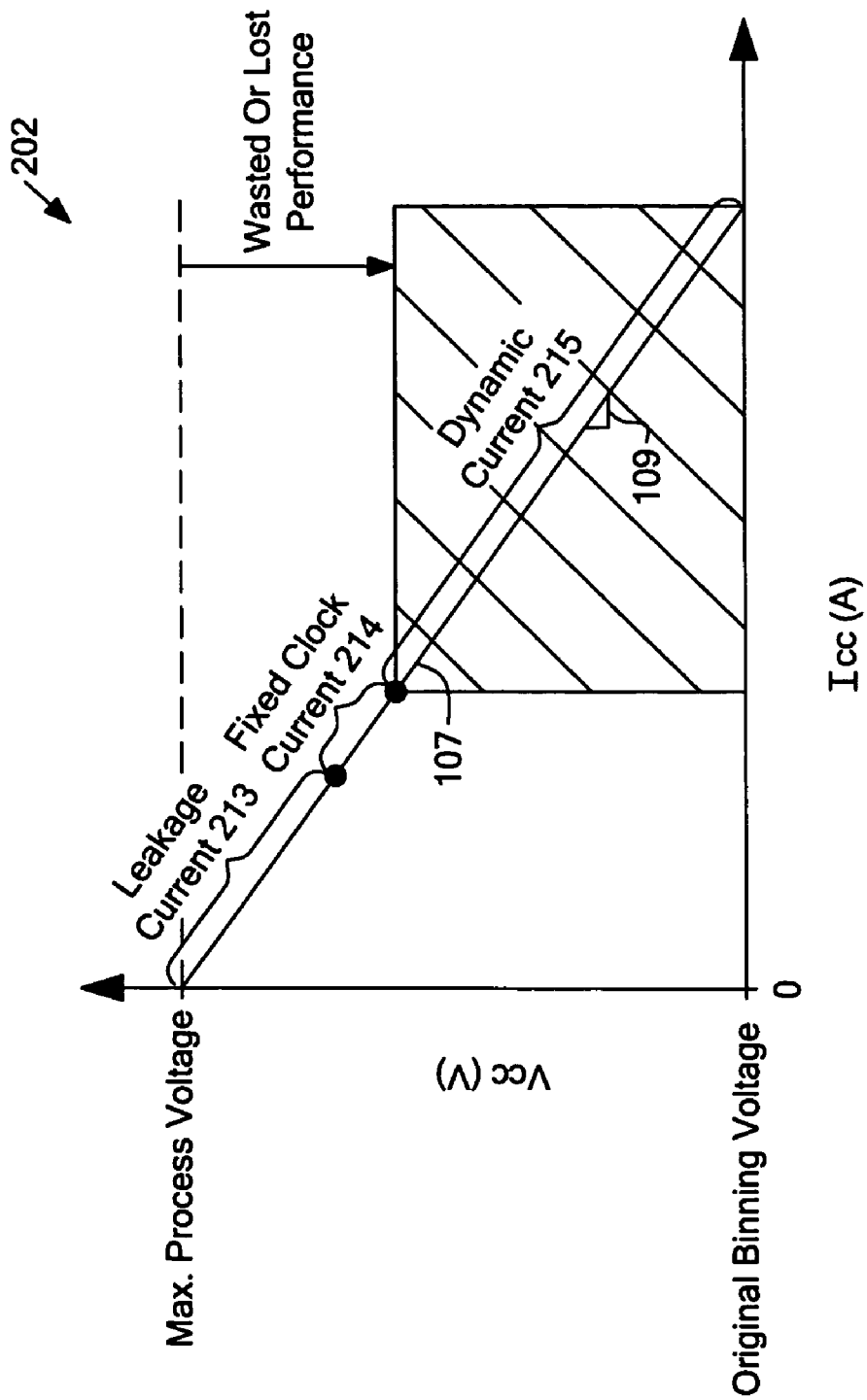
FIG. 2 shows different aspects of the conventional loadline as considered by an embodiment of the invention.

An embodiment of the invention specifies a loadline for a voltage regulator that is based mostly on the "dynamic current" portion of the total power supply current swing of a high performance integrated circuit device (that is to be powered by the regulator). Referring to FIG. 2, it has been realized that if the power supply current of the device actually stepped the entire range, between zero current and a maximum current (and back, as the device enters and exits various activity levels), then the conventional loadline 107 as shown will adequately position the power supply voltage for that case. However, high performance processors typically experience a much smaller swing in supply current, referred to here as a dynamic current step.

It should be noted that the term DC as used here denotes largely steady state, average or slowly varying behavior. The term AC denotes behavior that is transient, or in other words not DC. The term "droop" indicates an AC event that produces one or more voltage minima below the DC voltage. The term "spike" indicates an AC event that produces one or more voltage maxima above the DC voltage. It is well known that large droops generally occur due to a sudden increase in load current, and conversely, large spikes generally occur due to a sudden decrease in load current. AC events can include both minimas below the DC voltage and maximas above the DC voltage, and we would consider the larger individual minimas to be droops, while we would consider the larger individual maximas to be spikes.

The voltage droop magnitude is generally proportional to the increasing current step that caused it, while the voltage spike magnitude is generally proportional to the decreasing current step that caused it. The proportionality constant is known as the AC loadline resistance, and it has units of ohms (volts per amp). In a well designed power delivery network, the rough equality of the AC and DC loadline resistances roughly equalizes all the voltage minimums whether they are a result of maximum DC load current or a result of an AC step from minimum current to maximum current, or some other more complicated current waveform. The rough equality of AC and DC loadline resistances also roughly equalizes the voltage maximas whether they are a result of minimum DC load current or a result of an AC step from maximum current to minimum current, or some other more complicated current waveform.

In FIG. 2, the conventionally specified loadline 107 has a constant slope 109 and spans a range of device current that includes a leakage current range 213 starting from zero current, a fixed clock current range 214, and then a dynamic current range 215. Each of these is depicted as a range because the current may vary as a function of various factors including fabrication process variations, operating temperature variation, and device activity levels. Thus, the total power supply current at a given point in time may consist essentially of the sum of a device's leakage, fixed clock, and dynamic currents.

Leakage current refers to the portion of the total current into a power supply voltage "pin" of an IC device that is due mostly to leakage current from the constituent circuit components (transistors, capacitors, etc.). The leakage current can be measured under steady state device operating conditions, by measuring the power supply current drawn in a very low power state. As an example, for a PENTIUM processor by Intel Corp., Santa Clara, Calif., the leakage current may be the current that is drawn when the processor is in a DEEP SLEEP state. Leakage current can generally be considered DC current, since it generally changes very slowly. Since the leakage current is a DC current, it cannot contribute to voltage droops or spikes.

As to fixed clock current, this can be viewed as the portion of the total current that is mostly due to running clocks in the high performance integrated circuit which may be generally fixed in frequency regardless of whether the integrated circuit device is in an active/normal processing mode or a lower power consumption or sleep mode. As an example, the fixed clock current of a PENTIUM processor can be measured by measuring the power supply current drawn by the device during a HALT state (or some other minimally active state), and then subtracting the leakage current. Since the fixed portion of the clock current is, by definition, constant while the integrated circuit is operating, it can be considered a DC current. Since the fixed portion of the clock current is DC while the integrated circuit is operating, it can not contribute to voltage droops or spikes while the integrated circuit is operating.

The dynamic current range 215 (also referred to as dynamic current 215) is the portion of the power supply current that is mostly due to the integrated circuit device (IC) operation. One way to define dynamic current is to subtract the leakage current and fixed clock current from the total supply current. There are certain IC activities that demand a large amount of current, while there are others that have very little current demand. The IC can often quickly transition between high current and low current activities. Since IC operation is dynamic or changing in nature, the dynamic current is AC.

The conventional loadline 107 starts at or just below a maximum fabrication process voltage at zero current, and in this case linearly extends down to what is referred to as an original binning voltage at maximum current. The binning voltage is the power supply voltage that will be used for testing a particular, manufactured device that may guarantee performance of that device to be within a given defined range or bin. A higher binning voltage generally ensures that the device will operate faster and therefore give greater performance. When specifying a conventional loadline 107, a smaller loadline slope 109 (fewer milliohms) generally yields a higher binning voltage. As was discussed previously, optimal design practice usually dictates roughly equal values for the AC loadline resistance and the DC loadline resistance. Unfortunately, a smaller AC loadline resistance generally implies a voltage regulator with higher decoupling cost. Thus, there is a significant cost associated with decreasing the loadline resistance in order to increase performance.

Figure 3:
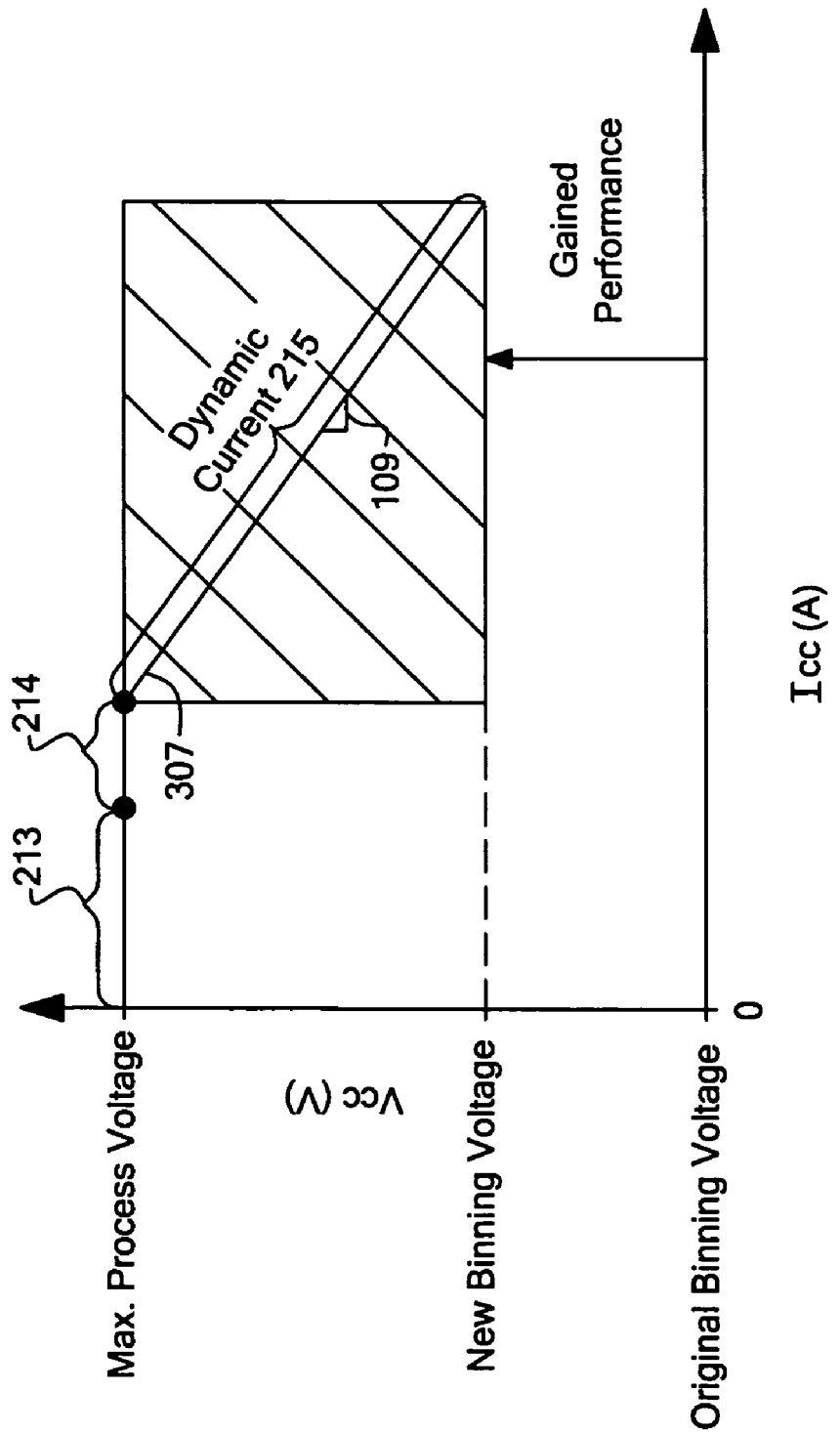
FIG. 3 depicts a loadline in accordance with an embodiment of the invention.

In accordance with an embodiment of the invention, by recognizing that the integrated circuit device's operating frequency and its tested frequency can be based on a "dynamic-only" loadline, the wasted or lost performance region of Vcc that is indicated in FIG. 2 can be recaptured. This is illustrated in FIG. 2 and FIG. 3, by shifting the rectangle of dynamic current 215 upwards, in this case all the way up to the maximum process voltage (see the new loadline 307, in FIG. 3). With the loadline 307 defined as in FIG. 3, the dynamic current range 215, which represents the area of operation of the integrated circuit device that normally creates the largest deltaI/deltat, starts at or near the maximum process voltage and drops in this example linearly (i.e., with the slope 109 being constant) down to a new binning voltage. Note how this new binning voltage is substantially greater than the original binning voltage. With this definition of the loadline 307, the integrated circuit device can be designated as one that can perform at a higher performance level (higher binning voltage). This is achieved without requiring stricter decoupling or a higher performing voltage regulator (because the new loadline 307 can have the same slope as the original loadline 107). Note that the loadline 307 in this case may not have any specific requirements for the range from zero current up to the sum of the maximum leakage current 213 and maximum fixed clock current 214, because there are no meaningful current surges or steps expected in that range. In other words, the variation in processor current below the dynamic current range 215 is, in most cases, not expected to require an active voltage positioning mechanism. Hence, the loadline 307 has zero slope in that range.

Figure 4:
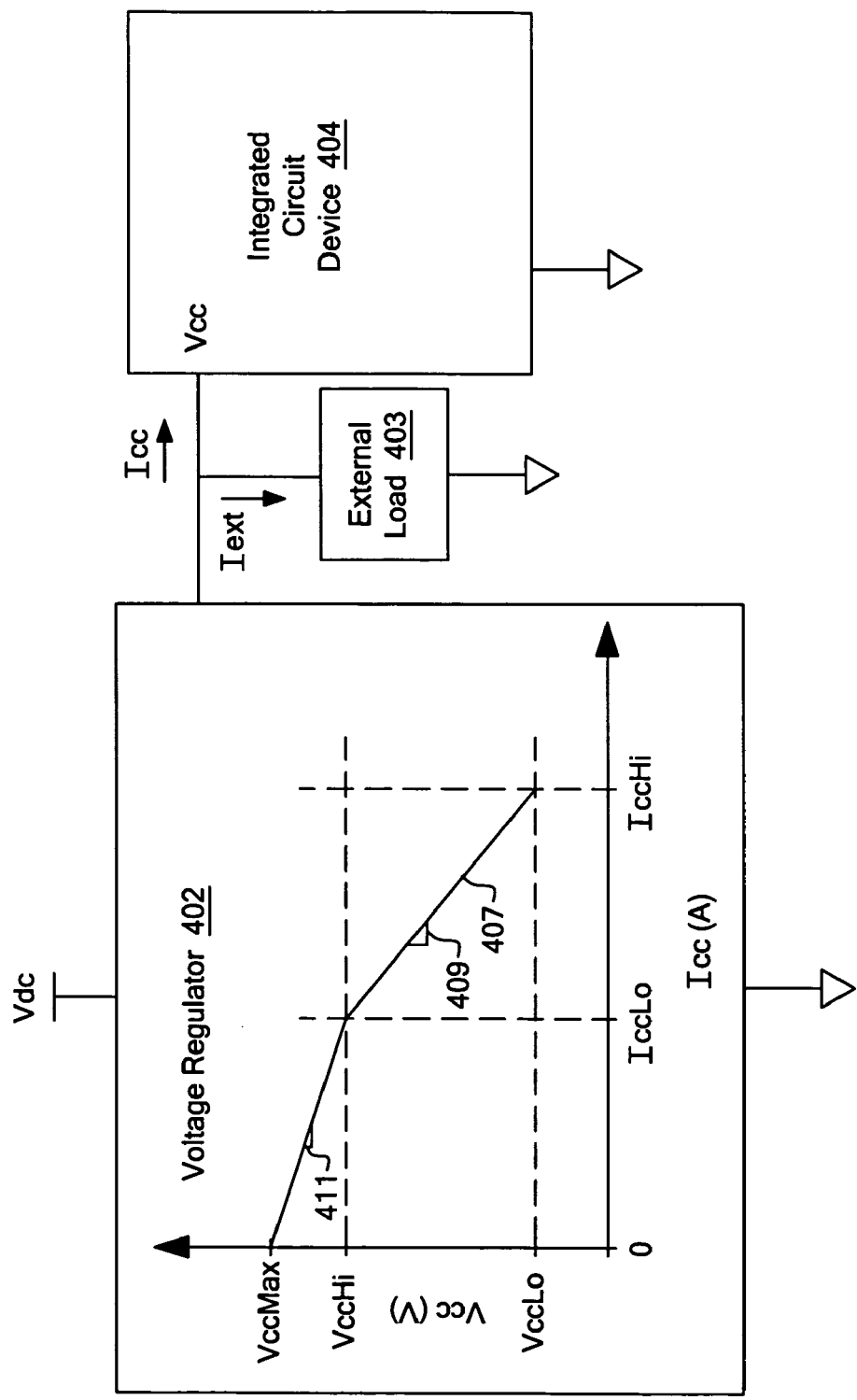
FIG. 4 is a block diagram of a voltage regulator that is coupled to power an integrated circuit device, where the voltage regulator has characteristics that comply with a given loadline.

Nevertheless, there may be a situation where the loadline slope below the dynamic current is non-zero. In such a situation, the loadline slope for non-dynamic load current would be much more shallow (in other words, the voltage would be a weaker function of non-dynamic current). An example of such an embodiment is depicted in FIG. 4, where a voltage regulator 402 is shown that powers an integrated circuit device 404 and an external load 403. The regulator 402 has a loadline 407 (with a slope 409) that ranges from a lower processor voltage limit VccLo to an upper processor voltage limit VccMax, as a function of the processor power supply current Icc, from an upper processor current level IccHi to a lower current level IccLo and then down to zero current, respectively.

In FIG. 4, the portion of the loadline 407 (or loadline window) that lies below IccLo has a smaller (yet non-zero) slope 411 than slope 409 of the dynamic range between IccLo and IccHi. The leakage and fixed clock portions are between zero current and IccLo, and between VccHi and VccMax (the maximum process dictated power supply voltage). This portion of the loadline 407 represents the non-dynamic loadline resistance (slope 411) for the voltage regulator 402. This is in contrast to the dynamic loadline resistance that is represented by the slope 409. As can be seen, the slope 409 is substantially greater than the slope 411. Measurements for the leakage and dynamic loadline resistances may be made as follows.

For the non-dynamic loadline resistance, place the integrated circuit device 404 into a defined low power consumption state (e.g., HALT), or alternatively simply a low activity level (e.g., repeatedly executing a simple calculation internal to the integrated circuit device without much I/O). This is a situation where the power supply current is somewhere in the range zero to IccLo (closer to, or even at, IccLo) in FIG. 4. Next, only the temperature of the integrated circuit device 404 is increased (which increases the leakage current), and the resulting deltaV/deltaI is measured. This value may be taken as the measured non-dynamic loadline resistance (i.e., the measured deltaV/deltaI in the zero to IccLo range of the regulator loadline).

For the dynamic loadline resistance, with the integrated circuit device 404 running a simple internal calculation (this is an example of a "low current" program or application), launch a demanding application such as a compressed audio and video file playback (a "high current" program). This results in a surge in the power supply current (being an example of a dynamic current step between IccLo and IccHi). The resulting deltaV/deltaI is again measured. This measurement may be deemed the dynamic loadline resistance, or deltaV/deltaI in the dynamic range of the loadline, in this case above IccLo. In such an embodiment, the measured deltaV/deltaI in the leakage range would be much lower than in the dynamic range.

Figure 5:
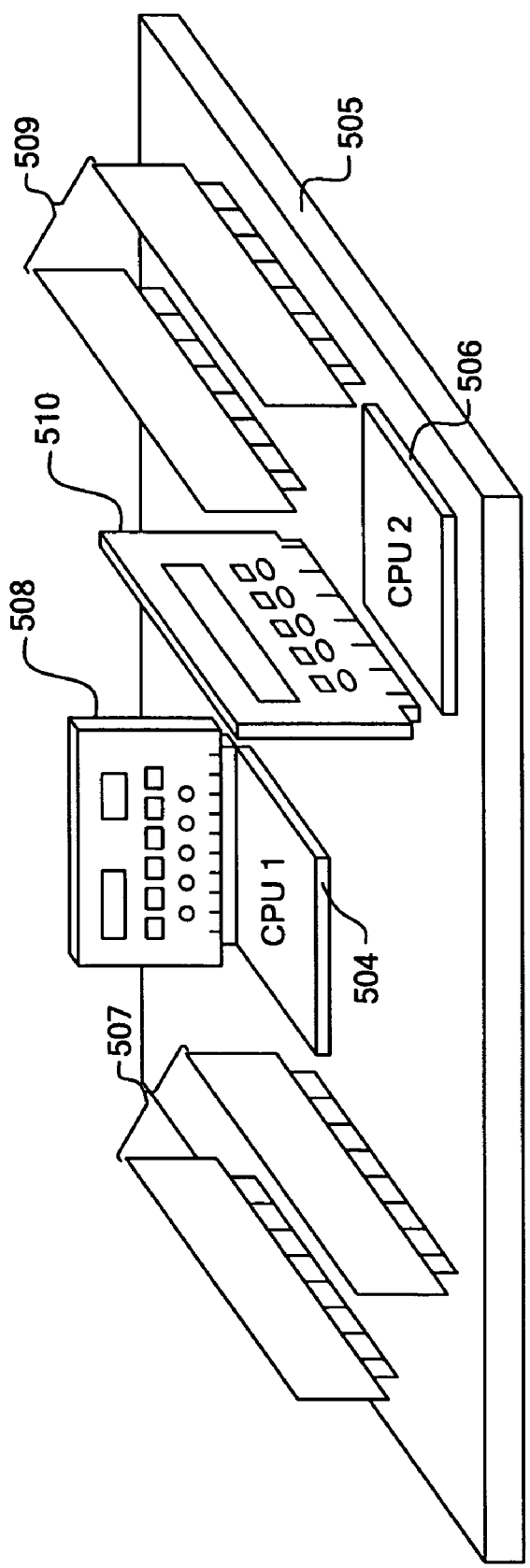
FIG. 5 is a conceptual perspective view of voltage regulator modules installed on a central processing unit (CPU) motherboard.
Figure 6:
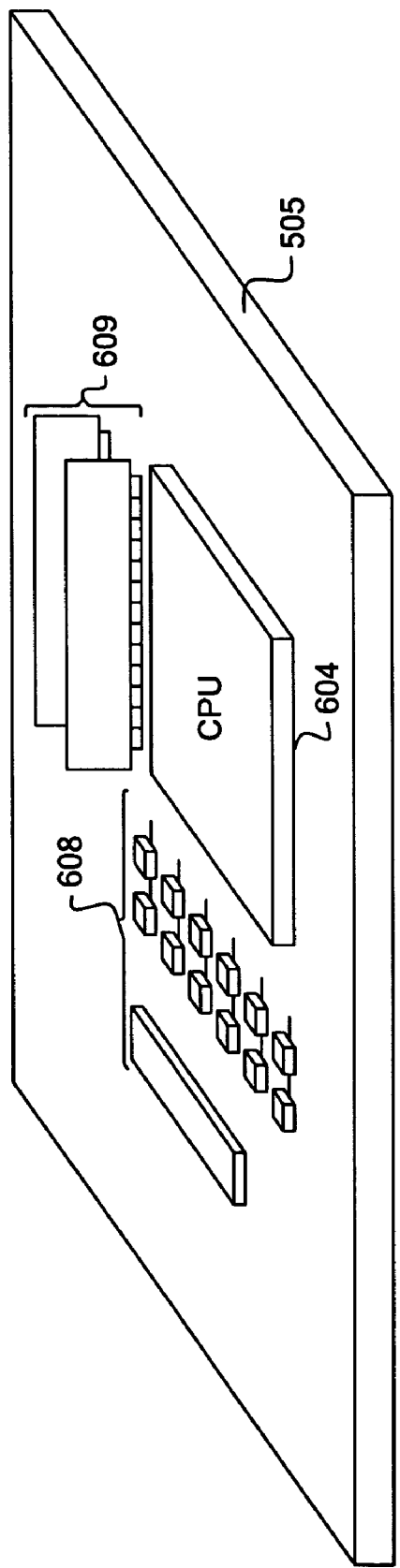
FIG. 6 is a conceptual perspective view of a motherboard with a CPU and its point-of-use voltage regulator directly installed on the board.

One or more embodiments of the invention described here are directed to a step-down, DC-DC multi phase switching voltage regulator (VR) that has adaptive voltage positioning according to the loadlines described above. FIG. 5 and FIG. 6 show different system applications of the VR. In FIG. 5, a computer system is shown having a motherboard 505, which is a printed wiring board, on which are installed a pair of CPUs 504, 506 and their respective VR modules 508, 510. Each CPU is coupled to its respective main memory 507,509 which is also installed on the motherboard 505. Each CPU may have one or more processor cores that draw their power supply current from a Vcc input of the CPU package (not shown). The circuitry that makes up the VR, including a VR controller and its phases, are in this embodiment installed directly on the module 508, to power the CPU 504. Similarly, VR circuitry is installed directly on the other module 510, to power the CPU 506, such that each of the CPUs has its own separate VR module. This arrangement may be extended of course to more than 2 CPUs on the motherboard 505.

FIG. 6 shows an alternative arrangement for the motherboard 505, where a single CPU 604 is directly installed on the motherboard 505. In this case, the VR 608 is also directly installed on the motherboard 505, to power the CPU 604. The CPU 604 is also coupled to one or more memory modules 609 that are directly installed on the motherboard 505. This configuration is sometimes referred to as "voltage regulator—down".

In yet another embodiment, the VR controller circuitry can be integrated on chip with its CPU.

The voltage dependence of the VR as controlled by the VR controller circuitry, may be based on an estimate of the CPU's dynamic current. This estimate may be determined by the CPU itself and then passed to the VR controller circuitry. Alternatively, the VR controller circuitry itself could calculate the estimate, using other information from the CPU (e.g., CPU temperature). This allows the VR to further adapt the loadline to the CPU operating conditions.

In other embodiments, a method for specifying the delivery of power to an integrated circuit device includes determining leakage current, fixed clock current, and dynamic current at a power supply node of a sample of an integrated circuit device; and specifying a loadline for delivering power to the integrated circuit device based on the determinations, wherein the loadline is more a function of the device's dynamic current than either leakage current or fixed dock current. Total power supply current for the device at a given point in time may consist essentially of the sum of its leakage, fixed dock, and dynamic currents. The loadline may span a range of device current that includes a leakage current range, a fixed dock current range, and a dynamic current range, and wherein a slope of the loadline is greater in the dynamic current range than in either the leakage or fixed dock current ranges. In other words, the voltage dependence on processor leakage, processor fixed dock current, or non-processor load current is secondary (in importance) to its more fundamental, and stronger, dependence on processor dynamic current.

The invention is not limited to the specific embodiments described above. For example, although the slope of the different loadlines depicted in the figures is constant, indicating a linear relationship between the voltage and current, the reference to "linear" also includes instances where a portion or all of the loadline is not perfectly linear. Accordingly, other embodiments are within the scope of the claims.

What is claimed is:

1. A voltage regulator controller comprising:
   logic to regulate a direct current (DC) output voltage of power conversion circuitry in accordance with a loadline, the loadline being a) a primary function of a dynamic portion of a load circuit supply current and b) a secondary and weaker function of a leakage portion and a fixed clock portion of the load circuit supply current, wherein the loadline is to reach its maximum at a value of the load circuit supply current that is about equal to the sum of a) a power supply leakage current of the load circuit, and b) a power supply fixed clock current of the load circuit, and wherein the loadline is a monotonically decreasing function of the load circuit supply current, from essentially zero current to dynamic current.

2. The controller of claim 1 wherein its DC loadline resistance for load current external to the load circuit is less than its DC loadline resistance for the dynamic portion of the load circuit supply current.

3. The controller of claim 1 wherein said logic is integrated on-chip with the load circuit.

4. The controller of claim 1 wherein said logic is to receive an estimated dynamic load current from the load circuit.

5. The controller of claim 1 wherein said logic is to calculate an estimate for the dynamic portion of the load circuit supply current using temperature information from the load circuit.

6. The controller of claim 1 wherein the primary and secondary functions of the load circuit supply current are linear.

7. The controller of claim 1 wherein the logic is to operate the power conversion circuitry in the dynamic portion of load circuit supply current, using a sensed or predicted change in supply current of at least a portion of the load circuit.

8. A method for delivering power to an integrated circuit device, comprising:
determining dynamic current at a power supply node of the integrated circuit device; and
positioning a power supply voltage primarily as a function of the determined dynamic current wherein the voltage is positioned with less dependence on integrated circuit leakage current than on integrated circuit dynamic current, and wherein the voltage is positioned with less dependence on integrated circuit fixed clock current than on integrated circuit dynamic current, wherein the positioned power supply voltage is a monotonically decreasing function from essentially zero current to the determined dynamic current.

9. The method of claim 8 wherein the voltage is positioned with less dependence on current from an external load than on integrated circuit dynamic current.

10. The method of claim 8 wherein the determination of the dynamic current is performed by the integrated circuit device.

11. The method of claim 8 wherein the positioning of the voltage is performed by a voltage regulator that is on-chip with the integrated circuit.

12. The method of claim 8 wherein the positioning of the voltage is a linear function of the dynamic integrated circuit current.

13. A system comprising:
power conversion circuitry having a plurality of phases; and
an integrated circuit coupled with the power conversion circuitry, the integrated circuit including load circuitry and voltage regulation control circuitry, the voltage regulation control circuitry having logic to regulate a loadline of the power conversion circuitry so that the loadline is primarily a function of load circuit dynamic current and the loadline voltage dependence on load circuit leakage current and load circuit fixed clock current is effectively zero, and wherein the loadline is a monotonically decreasing function from essentially zero current to the load circuit dynamic current.

14. The system of claim 13 wherein the loadline has essentially no voltage dependence on any currents drawn from the power conversion circuitry by elements of the system, other than the integrated circuit.

15. The system of claim 13 wherein a supply voltage of the integrated circuit is a linear function or largely linear function of the load circuit dynamic current.

16. The system of claim 13 wherein the voltage regulation control circuitry is integrated on-chip with the integrated circuit.

17. The system of claim 16 wherein the load circuitry comprises a plurality of processor cores each of which is coupled to be powered by the same output node of the power conversion circuitry.

18. The system of claim 13 further comprising a module board on which the power conversion circuitry is directly installed.

19. The system of claim 13 further comprising a motherboard on which the load circuitry and power conversion circuitry are directly installed.

20. A voltage regulator controller comprising:
logic that is capable of regulating a direct current (DC) output voltage of power conversion circuitry, the logic being capable of changing the DC output voltage as a) a primary function of a dynamic portion of a load circuit supply current and b) a secondary, weaker function of a leakage portion and a fixed clock portion of the load circuit supply current, wherein the DC output voltage is to reach its maximum at a value of the load circuit supply current that is about equal to the sum of a) a power supply leakage current of the load circuit, and b) a power supply fixed clock current of the load circuit, and wherein the DC output voltage is a monotonically decreasing function of the load circuit supply current from essentially zero current to dynamic current.

21. The controller of claim 20 wherein its DC loadline resistance for load current external to the load circuit is less than its DC loadline resistance for the dynamic portion of the load circuit supply current.

22. The controller of claim 20 wherein said logic is integrated on-chip with the load circuit.

23. The controller of claim 20 wherein the controller is to operate in the dynamic portion of load circuit supply current, using a sensed or predicted change in the supply current of at least a portion of a load circuit.

* * * * *

UNITED STATES PATENT AND TRADEMARK OFFICE
CERTIFICATE OF CORRECTION

PATENT NO.        : 7,642,764 B2                                    Page 1 of 1
APPLICATION NO.   : 11/418326
DATED             : January 5, 2010
INVENTOR(S)       : Burton et al.

It is certified that error appears in the above-identified patent and that said Letters Patent is hereby corrected as shown below:

On the Title Page Item (57), after "fixed," delete, "dock" and insert --clock--.

Signed and Sealed this
Twenty-fifth Day of January, 2011

David J. Kappos
*Director of the United States Patent and Trademark Office*